United States Patent [19]

Hsu

[11] 4,435,435

[45] Mar. 6, 1984

[54] RICE PASTA COMPOSITION

[75] Inventor: Jau Y. Hsu, Brookfield, Conn.

[73] Assignee: Societe d'Assistance Technique pour Produits Nestle S.A., Lausanne, Switzerland

[21] Appl. No.: 327,913

[22] Filed: Dec. 7, 1981

[51] Int. Cl.$^3$ .................................................. A23L 1/16
[52] U.S. Cl. .................................. 426/557; 426/804; 426/451
[58] Field of Search ................. 426/557, 575, 804, 618

[56] References Cited

U.S. PATENT DOCUMENTS 3,836,680  9/1974  Salza ..................................... 426/557
3,992,554  11/1976  Blake .................................... 426/557

OTHER PUBLICATIONS

*Family Circle Cooking*, vol. 12, Rockville House Pub. Inc., N.Y. 1972, p. 1415.

Primary Examiner—Raymond N. Jones
Assistant Examiner—Elizabeth A. Hatcher
Attorney, Agent, or Firm—Vogt & O'Donnell

[57] ABSTRACT

A composition comprising uncooked rice flour and, based on the weight of the uncooked rice flour, from 0 to 40% by weight of precooked rice flour, from 0 to 4% by weight of sodium or potassium alginate or a mixture thereof and from 0 to 4% by weight of propylene glycol alginate with the proviso that when the composition contains less than 5% by weight of precooked rice flour, both the alginates should be present in amounts of at least 1% by weight.

12 Claims, No Drawings

RICE PASTA COMPOSITION

The present invention relates to rice pasta compositions particularly those which can be processed into pasta the same way that regular wheat pasta is manufactured.

Regular wheat pastas i.e. pastas that need cooking for consumption can be made simply by mixing wheat flour with water, then extruding into pasta shapes and drying. The resulting pasta has good strength, with good cooked firmness and low cooking losses. However rice pasta prepared in this way has poor strength with low cooked firmness and high cooking losses.

Therefore rice pasta is prepared by a variety of alternative methods the most common being the conventional Oriental process which requires steam cooking of ground regular or waxy rice to gelatinise the rice starch in order to obtain a firm pasta structure. However, this process is cumbersome, energy consuming and expensive. In another process, wheat flour or wheat gluten is added to rice flour to improve extrusion and formation of the pasta structure but the defect of this approach is the diminution of the characteristics of the rice pasta, such as flavour, texture and appearance. Other newer methods involve either mixing boiled rice with rice flour which enables rice flour to be rolled into the pasta shape, or extrusion cooking of rice flour with water which completely or partially gelatinises the rice flour and forms the pasta structure. Unfortunately, the problems of using partially or completely precooked rice in a regular pasta which requires cooking are the poor cooking qualities, especially the high cooking loss and low cooked firmness.

We have now devised a rice pasta composition which can be made into a rice pasta by mixing dry ingredients with water, extruding and drying as in the regular wheat pasta process and, if desired, adding a precooking step to this process. The rice pasta prepared from this composition has good strength with low cooking losses and high cooked firmness.

Accordingly, the present invention provides a composition comprising uncooked rice flour and, based on the weight of the uncooked rice flour, from 0 to 40% by weight of precooked rice flour, from 0 to 4% by weight of sodium or potassium alginate or a mixture thereof and from 0 to 4% by weight of propylene glycol alginate with the proviso that when the composition contains less than 5% by weight of precooked rice flour, both the alginates should be present in amounts of at least 1% by weight.

The present invention also provides a first process for preparing a rice pasta characterised in that a pasta dry mix containing uncooked rice flour and, based on the weight of uncooked rice flour, from 5 to 40% by weight of precooked rice flour, from 0 to 4% by weight of sodium or potassium alginate or a mixture thereof and from 0 to 4% by weight of propylene glycol alginate is mixed with an amount of water sufficient to moisten the dry pasta mix and render it extrudable, extruded into a pasta shape, optionally precooked and finally dried, with the proviso that when the pasta is not precooked both the alginates must be present in amounts of at least 0.1% by weight based on the weight of uncooked rice.

The amount of precooked rice flour used in the first process is preferably from 10 to 35% by weight and especially from 15 to 30% by weight based on the weight of uncooked rice flour.

The amount of sodium or potassium alignate used in the first process is conveniently from 0.1 to 1.5% by weight, preferably from 0.2 to 1.2% by weight, and especially 0.3 to 1.0% by weight based on the weight of uncooked rice flour.

The amount of propylene glycol alginate used in the first process is conveniently from 0.1 to 1.5% by weight, preferably from 0.2 to 1.2% by weight, and especially 0.3 to 1.0% by weight based on the weight of uncooked rice flour.

The present invention also provides a second process for preparing a rice pasta characterised in that a dry pasta mix containing uncooked rice flour and, based on the weight of uncooked rice flour, 0 to 5% of precooked rice flour, at least 1% by weight of sodium or potassium alginate or a mixture thereof and at least 1% by weight of propylene glycol alginate is mixed with an amount of water sufficient to moisten the dry pasta mix and render it extrudable, extruded into a pasta shape, precooked and finally dried.

In the second process of the invention, the sodium or potassium alginate or mixture thereof is conveniently used in an amount of from 1.25 to 4.0% by weight, preferably 1.5 to 3.0% by weight, and especially from 1.75 to 2.25% by weight based on the weight of uncooked rice flour. Similarly, the propylene glycol alginate is conveniently used in an amount of from 1.25 to 4.0% by weight, preferably 1.5 to 3.0% by weight, and especially from 1.75 to 2.25% by weight based on the weight of uncooked rice flour.

In both the first and second process of the present invention, the calcium content of the sodium or potassium alginate is preferably not more than 5% by weight and especially not more than 3% by weight based on the weight of the alginate. The amount of water which is used is conveniently from 25 to 45% by weight, preferably from 28 to 40% by weight, and especially from 30 to 35% by weight based on the weight of the pasta dry mix.

When the processes of the present invention comprise a precooking step before the extruded pasta is dried, the processes may be used to prepare an instant rice pasta. However regular rice pasta may also be prepared by a process employing a precooking step and a precooked pasta is firmer than an uncooked pasta when cooked for consumption.

The precooking may be carried out by either water-boiling or by steam cooking. Steam cooking usually requires from 40 to 50% dough moisture for efficient cooking but at this moisture range the dough is too sticky for extruding. We have developed a technique where rice dough having a moisture content of from 27.5 to 35% is extruded and water is sprayed onto the extruded pasta dough before steaming. The steam temperature is generally from 90° C. to 110° C. and the cooking time is dependent on the pasta's size and the steam temperature.

The water used in the processes of the present invention may be hard or soft except when sodium or potassium alginate is used in the absence of or in the presence of extremely small amounts of propylene glycol alginate, in which case hard water should be used both for processing and cooking.

In the processes of this invention the uncooked rice flour may be regular rice flour or waxy (glutinous) rice flour, pasta made from the latter being softer than pasta made from the former. Also the firmness of the pasta may be increased by precooking or increasing the amount of propylene glycol alginate. Moreover if a whiter pasta is desired the amount of sodium or potassium alginate should be reduced and the amount of propylene glycol alginate should be increased. The processes of the two embodiments of the present invention are thus very versatile.

The pasta may be extruded into a variety of conventional shapes including all shapes of macaroni and noodle products which comprise all sizes of spaghetti, vermicelli, linguine, ziti, elbow spaghetti, orzo, shell, elbow macaroni, rigatoni, macaroni twist, rings, alphabets, lasagne, spirals, manicotti, noodles and bows.

The following Examples further illustrate the present invention parts and percentages being given by weight.

EXAMPLE 1

83.2 parts regular rice flour, 15 parts precooked rice flour, 1 part sodium alginate and 0.8 part propylene glycol alginate were premixed until uniform, mixed in regular or hard water (water without a softening treatment) to a total moisture content of 30 to 33%, extruded into noodle shape (1 cm wide, 0.75 cm thick and 5-6 cm long) in a noodle extruder and finally dried at 80-85% humidity and 50° C. for 3 hours. The moisture content of the dried rice pasta was 9-10%.

The pasta was then tested for dry pasta strength, relative cooking loss, relative cooked weight and cooked firmness by the following methods:

The dry pasta strength was determined by cutting a single strand pasta in an Instron Universal Testing Instrument. Using a Warner Bratzler meat shear test attachment the peak force required to shear the pasta is recorded ($kg/cm^2$).

The relative cooking loss was determined by boiling 15 g pasta for 8 minutes and drying at 100° C. for 4 hours. The dried pasta was weighed and the % loss calculated.

The relative cooked weight was determined by boiling 50 g pasta for 8 minutes and weighing the drained pasta weight (g).

The cooked firmness was determined by boiling 50 g pasta for 8 minutes, weighing out 80 g cooked pasta and recording the peak force required to shear the pasta in an Instron Universal Testing Instrument using a Kramer Shear Test attachment ($kg/cm^2$).

The results were as follows:

| | |
|---|---|
| Dry pasta strength | 3.2 $kg/cm^2$ |
| Relative cooking loss | 13.7% |
| Relative cooked weight | 114 g |
| Cooked firmness | 43 $kg/cm^2$ |

COMPARATIVE EXAMPLES A TO D

A process similar to that of Example 1 was carried out but using the quantities of ingredients shown in the following Table I.

TABLE I

| Example | A | B | C | D |
|---|---|---|---|---|
| Regular Rice flour | 100 | 98.2 | 84.2 | 84.0 |
| Precooked rice flour | — | — | 15.0 | 15.0 |
| Sodium alginate | — | 1.0 | — | 1.0 |
| Propylene glycol alginate | — | 0.8 | 0.8 | — |

The dry pasta strength, relative cooking loss, relative cooked weight and cooked firmness were determined by the same methods as used in Example 1.

The dry pasta strength of the pasta of Comparative Example A was only 1.5 kg and that of Example B was only 1.8 kg compared to 3.2 kg of the pasta of Example 1.

The cooking qualities (cooking loss and cooked firmness) of the pastas of Comparative Examples C and D were inferior to those of the pasta of Example 1 as shown in Table II.

TABLE II

| Example | 1 | C | D |
|---|---|---|---|
| Cooking loss | 13.7% | 26.0% | 16.8% |
| Cooked weight | 114 g | 101 g | 122 g |
| Cooked firmness | 43 kg | 33 kg | 26 kg |

EXAMPLE 2

A similar process to that described in Example 1 was carried out except that soft water was used instead of regular or hard water. The relative cooking loss was 18.8%, the relative cooked weight was 121 g and the cooked firmness was 37 $kg/cm^2$.

COMPARATIVE EXAMPLES E AND F

A process similar to that described in Example 2 was carried out but using the same ingredients as in Comparative Examples C and D respectively. The cooking qualities in soft water of the pastas of Comparative Examples E and F were inferior to those of the pasta of Example 2 as shown in Table III.

TABLE III

| Example | 2 | E | F |
|---|---|---|---|
| Relative cooking loss | 18.8% | 21.5% | 46.5% |
| Relative cooked weight | 121 g | 130 g | 99 g |
| Cooked firmness | 37 $kg/cm^2$ | 31 $kg/cm^2$ | 20 $kg/cm^2$ |

EXAMPLE 3

A regular type rice pasta that requires cooking for consumption was prepared by mixing and extruding 78 parts of uncooked rice flour, 20 parts of precooked rice flour, 1 part of sodium alginate, 1 part of propylene glycol alginate and 38 parts of water. The dough was extruded into Vermicelli shape with 1 mm diameter and dried at 80-85% relative humidity at 50° C. for three hours. The finished rice pasta had a good cooking quality similar to that of regular wheat pasta.

EXAMPLE 4

A procedure similar to that described in Example 3 was carried out but the extruded dough was steam cooked for 4 minutes at 100° C. before being dried. The finished rice pasta after cooking had a firmer texture to that of Example 3 and was very similar to the texture of Oriental rice pasta.

EXAMPLE 5

A procedure similar to that described in Example 4 was carried out but in the absence of propylene glycol alginate and wherein regular or hard water was used for processing and cooking. The firmness of the pasta was between that of the pastas of Examples 3 and 4.

EXAMPLE 6

An instant type rice pasta that requires no cooking (just rehydration with boiling water for 3 minutes) was prepared by mixing and extruding 74 parts of uncooked rice flour, 25 parts precooked rice flour, 0.5 part of propylene glycol alginate, 0.5 part of sodium alginate and 38 parts of water. The dough was extruded into Vermicelli shape with 0.70 mm diameter. Water was sprayed onto the dough which was then steam cooked for 6 minutes at 100° C. and dried at 80–85% humidity at 50° C. for 2½ hours. The finished pasta after rehydration had a firm texture similar to that of Oriental rice pasta.

EXAMPLE 7

A procedure similar to that described in Example 6 was carried out but in the absence of sodium alginate. The finished pasta after rehydration had a texture similar to that of Oriental rice pasta.

EXAMPLE 8

A procedure similar to that described in Example 6 was carried out but in the absence of alginates. The finished pasta was acceptable although not as firm as that prepared by the process of Example 7.

EXAMPLE 9

A procedure similar to that described in Example 6 was carried out but instead of steam cooking, the pastas were boiled for 3 minutes before drying. The texture of the rice pasta after rehydration was good.

EXAMPLE 10

A procedure similar to that described in Example 6 was carried out but instead of regular rice flour, waxy rice flour was used. The finished rice pasta after rehydration was softer than that prepared by the process of Example 6.

EXAMPLE 11

A procedure similar to that described in Example 6 was carried out except that no precooked rice flour was used and 1.5 part of sodium alginate and 1.5 part of propylene glycol alginate were used. The finished rice pasta after rehydration was acceptable.

I claim:

1. A composition comprising uncooked rice flour and, based on the weight of the uncooked rice flour, from 0 to 40% by weight of precooked rice flour, from 0.1 to 4% by weight of sodium or potassium alginate or mixture thereof and from 0.1 to 4% by weight of propylene glycol alginate wherein when the composition contains less than 5% by weight of precooked rice flour, each of the said alginates are present in an amount of at least 1% by weight.

2. A process for preparing a rice pasta comprising the steps of formulating a dry pasta mix containing uncooked rice flour and, based on the weight of the uncooked rice flour, from 5 to 40% by weight of precooked rice flour, from 0.1 to 4% by weight of sodium or potassium alginate or a mixture thereof and from 0.1 to 4% by weight of propylene glycol alginate, mixing together an amount of water sufficient to moisten the dry pasta mix and render it extrudable, extruding the mixture into a pasta shape, and drying to a desired moisture content.

3. A process according to claim 2, wherein the amount of precooked rice flour used is from 15 to 30% by weight based on the weight of uncooked rice flour.

4. A process according to claim 2, wherein the amount of sodium or potassium alginate used is from 0.3 to 1.0% by weight based on the weight of the uncooked rice flour.

5. A process according to claim 2, wherein the amount of propylene glycol alginate used is from 0.3 to 1.0% by weight based on the weight of uncooked rice flour.

6. A process for preparing a rice pasta comprising the steps of formulating a dry pasta mix containing uncooked rice flour and, based on the weight of uncooked rice flour, from 0 to 5% of precooked rice flour, at least 1% by weight of sodium or potassium alginate or a mixture thereof and at least 1% by weight of propylene glycol alginate, mixing therewith an amount of water sufficient to moisten the dry pasta mix and render it extrudable, extruding the mixture into a pasta shape, precooking and drying to a desired moisture content.

7. A process according to claim 6, wherein the sodium or potassium alginate or mixture thereof is used in an amount of from 1.5 to 3.0% by weight based on the weight of uncooked rice flour.

8. A process according to claim 6, wherein the propylene glycol alginate is used in an amount of from 1.5 to 3.0% by weight based on the weight of uncooked rice flour.

9. A process according to claim 2 or claim 6, wherein the calcium content of the sodium or potassium alginate is not more than 3% by weight based on the weight of the alginate.

10. A process according to claim 2 or claim 6, wherein the amount of water used is from 28 to 40% by weight based on the weight of the dry pasta mix.

11. A process according to claim 2 or claim 6, wherein the precooking is carried out by spraying water onto the extruded pasta shape and then steaming.

12. A process according to claim 2, wherein after the pasta has been extruded and prior to being dried, the pasta is precooked.

* * * * *

UNITED STATES PATENT AND TRADEMARK OFFICE
CERTIFICATE OF CORRECTION

PATENT NO. : 4,435,435
DATED : March 6, 1984
INVENTOR(S) : Jau Y. Hsu

It is certified that error appears in the above—identified patent and that said Letters Patent is hereby corrected as shown below:

Column 6, line 6 "together" should read --therewith--.

Signed and Sealed this

Twenty-second Day of May 1984

[SEAL]

Attest:

GERALD J. MOSSINGHOFF

Attesting Officer     Commissioner of Patents and Trademarks